A. SPIELMAN & A. P. POST.
SYSTEM OF DISTANT CONTROL OF GAS IGNITION BY MECHANICAL MEANS.
APPLICATION FILED DEC. 11, 1916.
1,273,197.
Patented July 23, 1918.
3 SHEETS—SHEET 1.
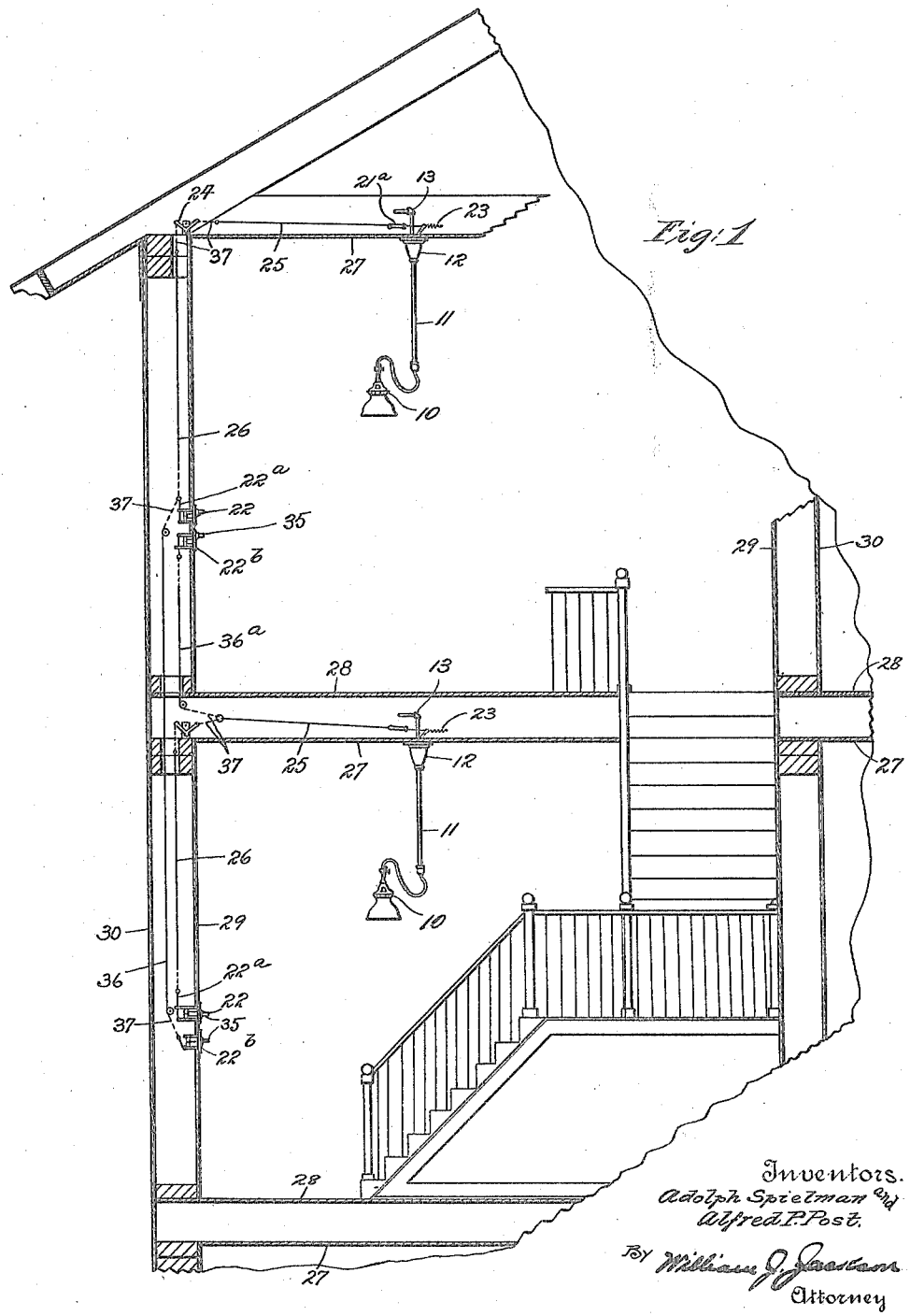

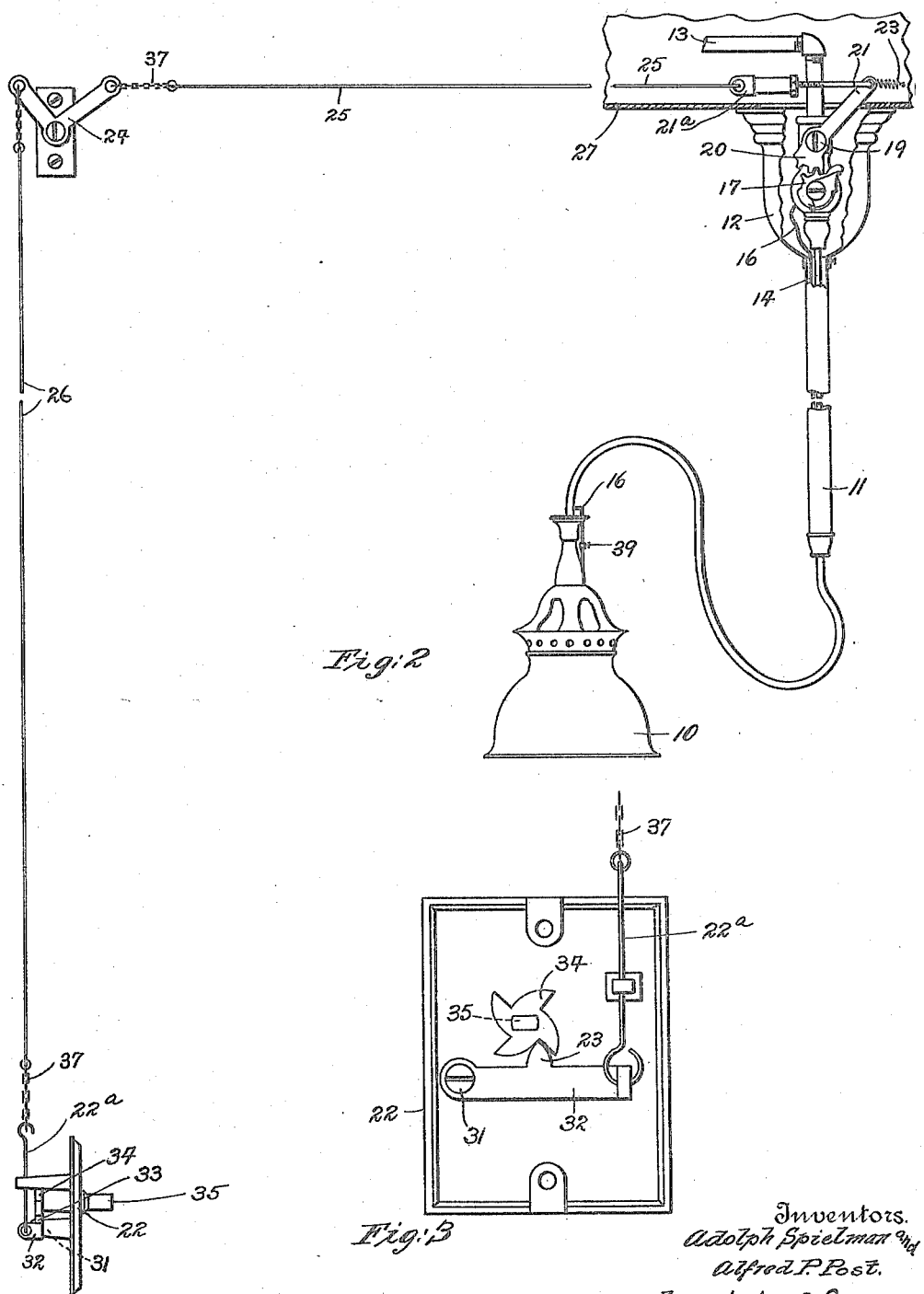

UNITED STATES PATENT OFFICE.

ADOLPH SPIELMAN AND ALFRED P. POST, OF PHILADELPHIA, PENNSYLVANIA.

SYSTEM OF DISTANT CONTROL OF GAS IGNITION BY MECHANICAL MEANS.

1,273,197. Specification of Letters Patent. Patented July 23, 1918.

Application filed December 11, 1916. Serial No. 136,233.

*To all whom it may concern:*

Be it known that we, ADOLPH SPIELMAN and ALFRED P. POST, citizens of the United States, residing at Philadelphia, in the county of Philadelphia and State of Pennsylvania, have invented a certain new and useful System of Distant Control of Gas Ignition by Mechanical Means, of which the following is a specification.

This invention relates to means for controlling gas ignition and has more particular relation to a system of controlling ignition of one or a battery of gas burners from a distance by mechanical means. At the present time, there is in use, means for gas ignition by pneumatic control, electrical control and pressure control. In practical use, gas burners thus controlled have proven unsatisfactory, commercially considered, for the reason that the same are not dependable, in that among other things clogging of the pneumatic tubes takes place, wearing out of the batteries takes place and unconsumed particles of gas interfere with the working parts of the gas system, thus interrupting the operation of gas. Further the cost of installation renders such equipment prohibitive in price for domestic and general usage. Aside from these disadvantages some of said systems are such that their working equipments render the same unsightly and a battery of burners cannot be controlled from a distance by mechanical or positive means. The principal object of the present invention is to overcome the above recited disadvantageous features and provide a new and novel system of distant control of gas ignition by mechanical means in which is combined dependability of the apparatus, low cost of installation, and the absence of devices detrimental to the appearance of the fixture parts. A further object of the present invention is to reduce to a minimum the cost of up-keep of a system of distant control of gas ignition by dispensing with batteries and mercury, the cleaning out of tubes, the oiling of parts and various adjustments as is now common in the systems of control aforesaid. Other and further objects of the present invention reside in the combining of the new and novel features, combinations, arrangements and connections of parts in a system of distant control of gas ignition as will hereinafter more fully appear.

The invention consists of the improvements hereinafter described and finally claimed.

The nature, characteristic features and scope of the invention will be more fully understood from the following description taken in connection with the accompanying drawings forming part hereof and in which:

Figure 1 is a view principally in section illustrating more or less diagrammatically one method of installing a system of distant control of gas ignition in accordance with the present invention.

Fig. 2 is a view partly in elevation and partly in section of a gas burner equipped with distant control mechanism for operating the same.

Fig. 3 is a detail view in rear elevation of an operating switch, and

Figure 4:
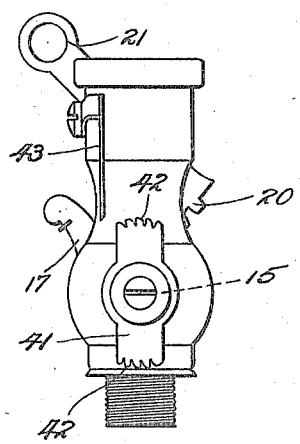
Figs. 4 and 5 are detail views detached of the gas valve shown in Fig. 2.

For the purpose of illustrating our invention, we have shown in the accompanying drawings one form thereof which is at present preferred by us, since the same has been found in practice to give satisfactory and reliable results, although it is to be understood that the same is susceptible of modification in various particulars without departing from the spirit or scope of the invention or sacrificing any of its advantages.

The system of distant control of gas ignition by mechanical means embodied in the present invention may be installed for the control of one or a battery of gas burners, may be installed in residences and place of business and may be used for the control of street and park lamps and like purposes. For the purpose of illustration there is shown in the drawings a lay-out suitable for residential gas ignition and the following description will be restricted thereto. The gas burner 10 carried by the fixture 11, of which there may be any number, is of the type having a pilot light connection from which gas is automatically ignited when turned on and the valve for controlling flow of gas to the burner is of the type which may be turned alternately off and on by similar successive movements of the operating mechanism. Obviously whether there be one or a cluster of burners upon a single fixture is immaterial. The fixture canopy is designated 12. Fitted between the main supply pipe 13 and the pipe 14 of the fixture and concealed by the canopy 12 is a valve casing provided with a valve which may be a rotary plug 15 see Fig. 5, for controlling flow of gas through the pipe 14. The pilot tube 16 extends from said valve to the burner and may pass down through the inclosing shell or casing of the fixture or it may be an integral part of the pipe 14 as is well understood in the art. Mounted upon one end of the plug 15 is a toothed segment 17 so adjusted with respect thereto by means of a torsion spring 18 that when said segment is moved in a clockwise direction, the plug is turned for the required operating distance but with movement of the segment in a counter-clockwise direction it rides freely over said plug. Pivoted as at 19 to the valve casing is a second segment 20 the teeth of which are in mesh with the teeth of segment 17. The segment 20 is provided with an arm 21 the free end of which is connected through an arrangement of wiring with an operating switch 22. A spring 23 connected to the arm 21 serves to insure the latter always returning to its position of rest. The wiring above mentioned may be, and as clearly shown in Fig. 1, is concealed from view. Connecting one arm of a bell crank lever 24 and a turn-buckle 21ª secured to arm 21 is a wire 25 and connecting the other arm of the bell crank lever and a link 22ª connecting with the operating switch 22 is a wire 26. As clearly shown in said figure, the wire 25 is extended along a joist between the ceiling 27 and floor 28 and the wire 26 is extended along an upright between the walls 29 and 30. The switch 22 is located at any convenient place in the wall of a room and in exterior appearance resembles an ordinary wall switch. Pivoted to the casing of the switch as at 31 is a lever 32 the free end of which has connected thereto the said link 22ª, see Fig. 3. This lever is provided upon its upper edge with a projection 33. Rotatably mounted upon the switch casing is a star-wheel 34 for cooperating with said projection for alternately depressing said lever 32 and permitting same to assume normal postion as the button or knob 35 is operated for on or off position of the valve 15. The form of switch, however, may be varied to accomplish the same operation and the particular construction illustrated is not essential to the successful working of the above described system of ignition. In order to operate a battery of burners, the same may be connected as shown in Fig. 1, two burners being shown for illustrative purposes. Adjacent each switch 22 above described is positioned a duplicate switch 22ᵇ. The link of the switch 22ᵇ upon the lower floor is connected by wire 36 with the link of the switch 22 of the upper floor and the link of the switch 22ᵇ of the upper floor is connected by wire 36ª with the wire 25 leading from bell-crank lever of the fixture of the lower floor. By this arrangement, the burners of the lower and upper floors may be ignited or extinguished from a central point or they may be ignited and extinguished from different points, in both instances, however, distant from the fixtures 11. At suitable places as indicated by reference numeral 37 short sections of links or light weight chain may be used in connection with the various wires so that in operating the various switches sufficient play is present between connecting parts. The links or chains also serve to take up slack in the wires to prevent buckling thereof.

Figure 6:
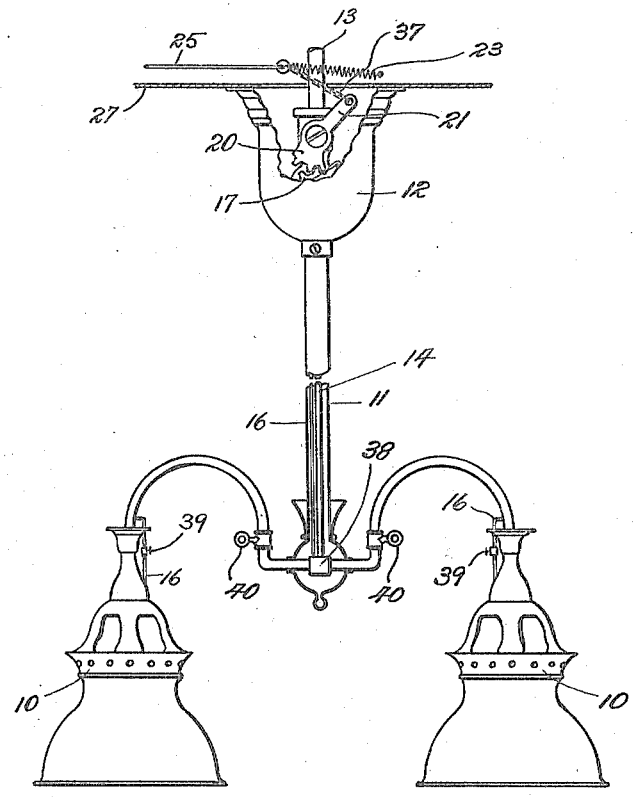
Fig. 6 shows a slightly different form of gas fixture.

A fixture having two or more arms equipped with gas burners, see Fig. 6, is provided with a manifold 38 leading to which from the valve casing within the canopy 12 is a pilot tube. Leading from the manifold 38 are other pilot tubes which extend to the burners. The latter pilot tubes, as well as the pilot tube shown in Fig. 1 are each provided with a needle 39 for regulating or shutting off the pilot tube supply of gas as may be desired. In the construction shown in Fig. 6, valves 40 are present so that gas supply to one burner may be entirely shut off if desired although in the construction shown in Figs. 1 and 2 such valve is not required.

The above described system of distant control of gas ignition by mechanical means may be installed in buildings equipped with present day gas fixtures at small expense and the readiness with which it may be installed in buildings in the course of erection is at once apparent. The cost of installation is low and the maintenance cost is reduced to a minimum in that little or no repairs are required since the working parts are dependable mechanical movements not calculated to become disorganized. Among the advantages claimed for the above described system are dependability, low cost of installation, concealed working parts and little or no maintenance cost. Another advantage is that as the gas is shut off at a point within canopy 12, gas cannot leak from defective gas burners during a "shut-off" period.

Figure 5:
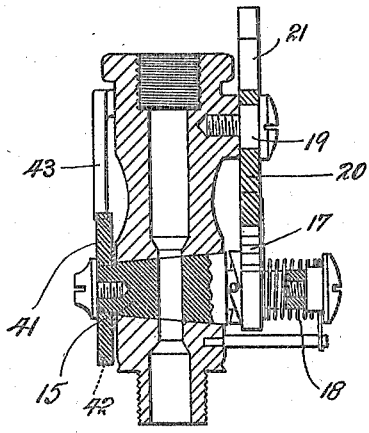

In connection with and forming a part of the operating mechanism of the gas valve located within the canopy 12 of a fixture is a device by means of which an audible signal notifies the party operating the switches 22—22ᵇ when gas has been shut off by closing of the valve plug 15. This device is illustrated in Figs. 4 and 5 and comprises a metal strip 41 secured to the valve plug and provided with serrated edges 42. Fixed to the valve casing in the path of movement of said strip is a strip of spring metal 43.

The parts are so arranged that when the valve plug is moved to position for admission of gas to a burner, see Fig. 5, the strips 41—43 do not contact but when the valve plug 15 is moved from position shown in said figure to that of shutting off gas, then a serrated edge of the strip 41 scrapes the free edge of strip 43 and produces a metallic sound which may be readily heard although no signal is visible as the device is contained within canopy 12.

It will now be apparent that we have devised a novel and useful construction which embodies the features of advantage enumerated as desirable in the statement of the invention and the above description and while we have in the present instance shown and described the preferred embodiment thereof which has been found in practice to give satisfactory and reliable results, it is to be understood that the same is susceptible of modifications in various particulars without departing from the spirit or scope of the invention or sacrificing any of its advantages.

What we claim is:

1. A system of distant control of gas ignition by mechanical means embracing in combination a gas fixture having a burner equipped with a pilot light attachment concealed throughout the major portion of its length, a concealed valve casing having a valve for controlling the gas supply to the burner, concealed means located so as to be free of attack from flowing gas for operating said valve, a mechanical switch isolated from said burner and concealed means connecting said switch with said valve moving means, which means is also located free of attack from flowing gas.

2. A system of distant control of gas ignition by mechanical means embracing in combination a gas fixture including a canopy, said fixture having a burner equipped with a pilot light attachment concealed throughout the major portion of its length, a valve casing provided with a valve located within and concealed by said fixture canopy for controlling the gas supply to the burner, means for operating said valve, a mechanical switch isolated from said burner, a concealed bell crank lever and concealed means for connecting one end of said bell crank lever to said valve operating means and the other end of said lever to said switch.

3. A system of distant control of gas ignition by mechanical means embracing in combination a battery of gas fixtures each having a burner equipped with a pilot light attachment concealed throughout the major portions of its length, a valve casing for each fixture provided with a concealed valve for controlling the gas supply to a burner, concealed valve operating means for each fixture, a mechanical switch for each burner but isolated therefrom, concealed means connecting each of said switches with a burner and independent switches connecting with said switch connecting means whereby a battery of lights may be controlled one independently of another by switches located in proximity to one another.

4. A system of distant control of gas ignition by mechanical means embracing in combination a battery of gas fixtures isolated one from another and each provided with a burner having a pilot light attachment, a valve casing provided with a valve concealed in each fixture for controlling the supply of gas to a burner, valve operating means also concealed in each fixture, a mechanical switch for each fixture but isolated therefrom, a bell crank lever for each switch, means connecting a switch with one end of said lever and means connecting the other end of a lever with said valve operating means, and an independent switch adjacent each of the aforesaid switches operatively connecting with the operating means of another switch.

5. A system of distant control of gas ignition by mechanical means embracing in combination a gas fixture having a canopy and provided with a burner equipped with a pilot light attachment, a valve casing having a rotary valve plug concealed in said canopy for controlling the gas supply to the burner, means also concealed in said canopy for impelling said plug in one direction only, means operative upon closing of said valve for giving an audible signal, a mechanical switch isolated from said fixture and means connecting switch with said plug moving means.

6. The combination in a structure to be illuminated by a system of distant control of gas ignition by mechanical means of a gas fixture including a burner supported by said structure, a canopy located at the juncture point of the fixture with said structure, a valve casing having a valve for controlling gas supply to the burner, means for operating said valve, said valve and valve operating means being concealed by said canopy, a pilot tube forming communication between said valve casing and burner, said tube being concealed by the fixture parts throughout the major portion of its length, a wall switch and means connecting said switch and valve moving means, said connecting means being concealed by a suitable portion of said structure to be illuminated.

7. The combination in a structure to be illuminated by a system of distant control of gas ignition by mechanical means of a gas fixture including a burner supported by said structure, a canopy located at the juncture point of the fixture with said structure, a valve casing having a valve for controlling gas supply to the burner, means for operating said valve, means operative upon closing of said valve for giving an audible signal, said valve, valve operating means and signal being concealed by said canopy, a pilot tube forming communication between said valve casing and burner, said tube being concealed by the fixture parts throughout the major portion of its length, a wall switch, and means connecting said switch and valve moving means, said connecting means being concealed by a suitable portion of said structure to be illuminated.

8. The combination in a structure to be illuminated by a system of distant control of gas ignition by mechanical means of a battery of gas fixtures including burners isolated from one another and supported by said structure, a canopy located at the juncture point of each fixture with said structure, a valve casing having a valve provided each fixture for controlling gas supply to a burner, means for operating said valve, said valve and valve operating means being concealed by a fixture canopy, a pilot tube forming communication between each valve casing and burner, said tube being concealed by a fixture throughout the major portion of its length, a wall switch for each fixture, means connecting each switch with the valve moving means of a fixture and an independent switch adjacent each of the aforesaid switches operatively connecting with the operating means of another switch, whereby the fixture valves may be independently operated from different parts of the structure to be illuminated, said connecting means being concealed by said structure.

9. A system of distant control of gas ignition by mechanical means embracing in combination a gas fixture having a burner equipped with a pilot light attachment concealed throughout the major portion of its length, a concealed valve casing provided with a rotary valve for controlling gas supply to the burner, concealed means mounted upon the valve casing for impelling said plug in one direction, a switch isolated from said burner operatively connecting in a concealed manner with said valve moving means for operating the same in one direction and concealed means connected with said valve moving means for returning the same to initial position independently of said switch.

In testimony whereof, we have hereunto signed our names.

ADOLPH SPIELMAN.
ALFRED P. POST.

Witnesses:
WILLIAM J. JACKSON,
HELEN M. BYRNE.

Copies of this patent may be obtained for five cents each, by addressing the "Commissioner of Patents, Washington, D. C."